(12) United States Patent
Otte

(10) Patent No.: US 6,257,863 B1
(45) Date of Patent: Jul. 10, 2001

(54) EXTRUDER DIES WITH SHAPING MEANS

(75) Inventor: Karl Hermann Otte, Lakefield (CA)

(73) Assignee: Industrial Thermo Polymers Limited, Ontario (CA)

( * ) Notice: Subject to any disclaimer, the term of this patent is extended or adjusted under 35 U.S.C. 154(b) by 0 days.

(21) Appl. No.: 08/962,544

(22) Filed: Oct. 31, 1997

(51) Int. Cl.[7] ................................... B29C 47/16
(52) U.S. Cl. ............... 425/381; 425/191; 425/192 R; 425/465; 425/466
(58) Field of Search .................. 425/298, 307, 425/308, 381, 465, 466, 191, 192 R; 264/167

(56) References Cited

U.S. PATENT DOCUMENTS

| 25,233 | 8/1859 | Linton . | |
|---|---|---|---|
| 427,562 | 5/1890 | English . | |
| 677,200 | * 6/1901 | Gaillard | 425/466 |
| 2,578,229 | 12/1951 | Clement et al. . | |
| 2,866,256 | 12/1958 | Matlin . | |
| 2,952,872 | * 9/1960 | Buteux et al. | 425/466 |
| 3,124,839 | * 3/1964 | Adams | 425/465 |
| 3,422,648 | * 1/1969 | Lemelson | 425/466 |
| 3,480,999 | * 12/1969 | Carlo | 425/465 |
| 3,932,090 | 1/1976 | Brumlik . | |
| 4,187,068 | 2/1980 | Vassar . | |
| 4,541,629 | 9/1985 | Witkowski . | |
| 4,632,795 | * 12/1986 | Huber et al. | 425/466 |
| 4,734,024 | 3/1988 | Tashiro | 425/132 |
| 5,031,520 | * 7/1991 | Tsay | 425/307 |
| 5,031,567 | * 7/1991 | Daouse et al. | 425/308 |
| 5,120,212 | 6/1992 | Reiber et al. | 425/141 |
| 5,153,010 | 10/1992 | Tashiro et al. | 425/287 |
| 5,190,770 | 3/1993 | Tashiro | 425/132 |

* cited by examiner

Primary Examiner—Nam Nguyen
Assistant Examiner—Joseph Leyson
(74) Attorney, Agent, or Firm—Eugene J.A. Gierczak

(57) ABSTRACT

An extruder for forming elongated articles made of a thermoplastic having a cross-section that varies along their length comprising a moveable means for defining an extrusion orifice.

12 Claims, 4 Drawing Sheets

EXTRUDER DIES WITH SHAPING MEANS

FIELD OF THE INVENTION

This invention relates generally to a method and an apparatus for extruding an elongated article having a cross-sectional profile that varies along its length. This invention further relates to an article of manufacture comprising an extruded thermoplastic rod having a variable cross-sectional profile, and a further article of manufacture comprising a thermoplastic tube having a variable cross-sectional profile.

BACKGROUND OF ART

Extruders used to produce objects made of extrudable materials are well known. Such extruders generally comprise a hopper through which an extrudable material is introduced into the extruder; a heating element to melt the extrudable material if such material is a thermoplastic; and an aperture or die through which the extrudable material is extruded.

There is a need to produce extruded objects having a cross-sectional profile that varies along its length by varying the size and shape of said aperture during the extrusion process. An extruder die having such a variable means for defining an aperture shaping means allows the extrusion, for example, of thermoplastic articles such as baseball bats, bowling pins, water toys and the like.

Means for extruding articles having a cross-sectional profile that varies along its length is also known.

U.S. Pat. No. 2,578,229 teaches a draw plate comprising a series of interlocked jaws defining a polygonal opening and means for adjusting the size of such opening so as to provide varying cross-sections for drawn members such as rods, bars and tubes and the like.

Means for shaping and cutting spherical objects from dough are also disclosed in U.S. Pat. Nos. 4,734,024, 5,153,010 and 5,190,770.

U.S. Pat. No. 4,734,024 relates to an apparatus for shaping a round body consisting of dough and filling. Said apparatus contains a cutter assembly having at least three circumferentially disposed cutter members arranged in sliding contact with each other so as to form a central aperture. Said central aperture is openable for receiving a leading part of a cylindrical body of dough and filling, and closable for shaping the received part into a shaped body substantially polygonal in form and severing it from the remainder of said cylindrical body of dough and filling.

U.S. Pat. No. 5,153,010 teaches an improved apparatus for cutting and shaping a spherical form made of dough with a filling. Said apparatus has a structure capable of accommodating a greater number of shaping members, hence, allowing dough to be a shaped into a form that is more substantially spherical than in U.S. Pat. No. 4,734,024. Said improved apparatus comprises a plurality of identically shaped polygonal members, each of which having a first end pivotally connected to one of a plurality of supports which are disposed equidistantly around a circular opening, and which polygonal members collectively define an aperture. Each of said polygonal members has a tip, first curved side and second curved side. When said polygonal members are in the open position, the first curved side of each of the polygonal members abuts said second curved side of the adjacent polygonal member. When said polygonal members are in the closed position, said tip of each of the polygonal members is disposed at the central point of said circular opening.

Similarly, U.S. Pat. No. 5,190,770 discloses another apparatus for cutting and shaping a spherical body which is particularly adapted to forming spherical articles from dough. The apparatus taught therein discloses a plurality of identically shaped cutting and shaping members, one end of each of the members being pivotally fitted to each of a plurality of fulcrums that are equidistantly disposed on an imaginary circumference formed by connecting said fulcrums, and the opposite end of each of said shaping members being formed into a tip so that said shaping members collectively and radially form and close an opening concentric to the circumference surrounded by said shaping members when each of said shaping members pivots away from and towards the centre of the circumference, respectively, thereby to cut and shape the dough passing through said opening.

Variable closure means more particularly adapted for extruding thermoplastic articles are also known.

U.S. Pat. No. 3,932,090 discloses an apparatus for extruding articles having integral ribs and/or integral rows of spaced apart elements extending transverse to the direction of extrusion by extruding melt flowable material in a first annular extrusion zone while the melt flowable material being extruded in a second annular extrusion zone is periodically interrupted, modulated and/or restricted.

U.S. Pat. No. 4,187,068 teaches an apparatus for extruding an elongated article having a cross-sectional profile which varies along its length comprising a die plate, stationary die block and plurality of die members. Said die members and stationary die block are mounted on said die plate and form together an orifice. A controllable drive means is also provided for to allow said die members to be moved contemporaneously along channels so as to modify the shape and size of said orifice.

It is an object of this invention to provide for a more efficient and simple apparatus for producing elongated articles from extrudable materials, comprising an extruder, first retaining member, second retaining member, sealing means and moveable means for defining an aperture disposed between said first and second retaining members. It is still a further object to provide for a process for extruding an elongated article having a cross-sectional profile that varies along its length by heating a melt flowable material in an extruder, extruding said melt flowable material through a moveable means for defining an aperture, and sealing said moveable means to said extruder. Finally, it is also an object of this invention to provide for an elongated article extruded from a thermoplastic material having a cross-sectional profile that varies along its length.

The moveable means for defining an aperture used in the present invention comprises an iris. The iris allows the shaping of objects that are more substantially spherical in shape than the apparati disclosed in the prior art, particularly U.S. Pat. No. 4,187,068. Furthermore, the cross-sectional profile of the aperture defined by said iris can be modified during the extrusion process with greater ease and speed than the controlling drive means and channels disclosed in U.S. Pat. No. 4,187,068 which in turn allows more efficient extrusion of elongated articles having a cross-sectional profile, and also permits greater variance of the cross-sectional profile of such elongated articles along their length when the same are extruded continuously. The iris used in the present invention also has cost advantages over other variable closure means disclosed in the prior art.

DISCLOSURE OF INVENTION

It is a first aspect of this invention to provide for an apparatus for extruding an elongated article having a cross-sectional profile that varies along its length, comprising an extruder, moveable means for defining an aperture and sealing means mounted between said extruder and said moveable means.

In accordance with yet another aspect of the invention, to provide for an apparatus for extruding an elongated article having a cross-sectional profile that varies along its length, comprising an extruder, first retaining member, second retaining member, moveable means for defining an aperture, and sealing means disposed between said first and second retaining members.

In accordance with still another aspect of the invention, to provide for an apparatus for extruding an elongated article having a cross-sectional profile that varies along its length, comprising an extruder having an orifice for heating a thermoplastic material to form an extrudable thermoplastic foam; moveable means for defining an aperture communicating with said orifice so as to open and close said orifice; first retaining member having a first hole therethrough; second retaining member having a second hole therethrough, said first retaining member threadably engageable with said second retaining member so as to retain said moveable means; and sealing means consisting of an o-ring.

In accordance with a further aspect of the invention, to provide for a process for extruding an elongated article having a cross-sectional profile that varies along its length, which comprises introducing an extrudable material into an extruder, discharging said melt flowable material through moveable means defining an aperture, and sealing said moveable means to said extruder.

In accordance with a further aspect of the invention, to provide for a process for extruding an elongated article having a cross-sectional profile that varies along its length, which comprises heating a thermoplastic material in an extruder to form a thermoplastic foam; extruding said thermoplastic foam through a first retaining member which is threadably connected to a second retaining member and wherein a sealing means and moveable means defining an orifice are disposed between said members; and extruding said thermoplastic foam to form an elongated article having a cross-sectional profile that varies with said varying aperture.

In accordance with a further aspect of the invention, to provide for an article of manufacture which consists of a thermoplastic rod having a cross-sectional profile that varies along its length.

In accordance with yet further an aspect of the invention, to provide for an article of manufacture which consists of a thermoplastic tube having a cross-sectional profile that varies along its length.

BEST MODE FOR CARRYING OUT THE INVENTION

Figure 1:
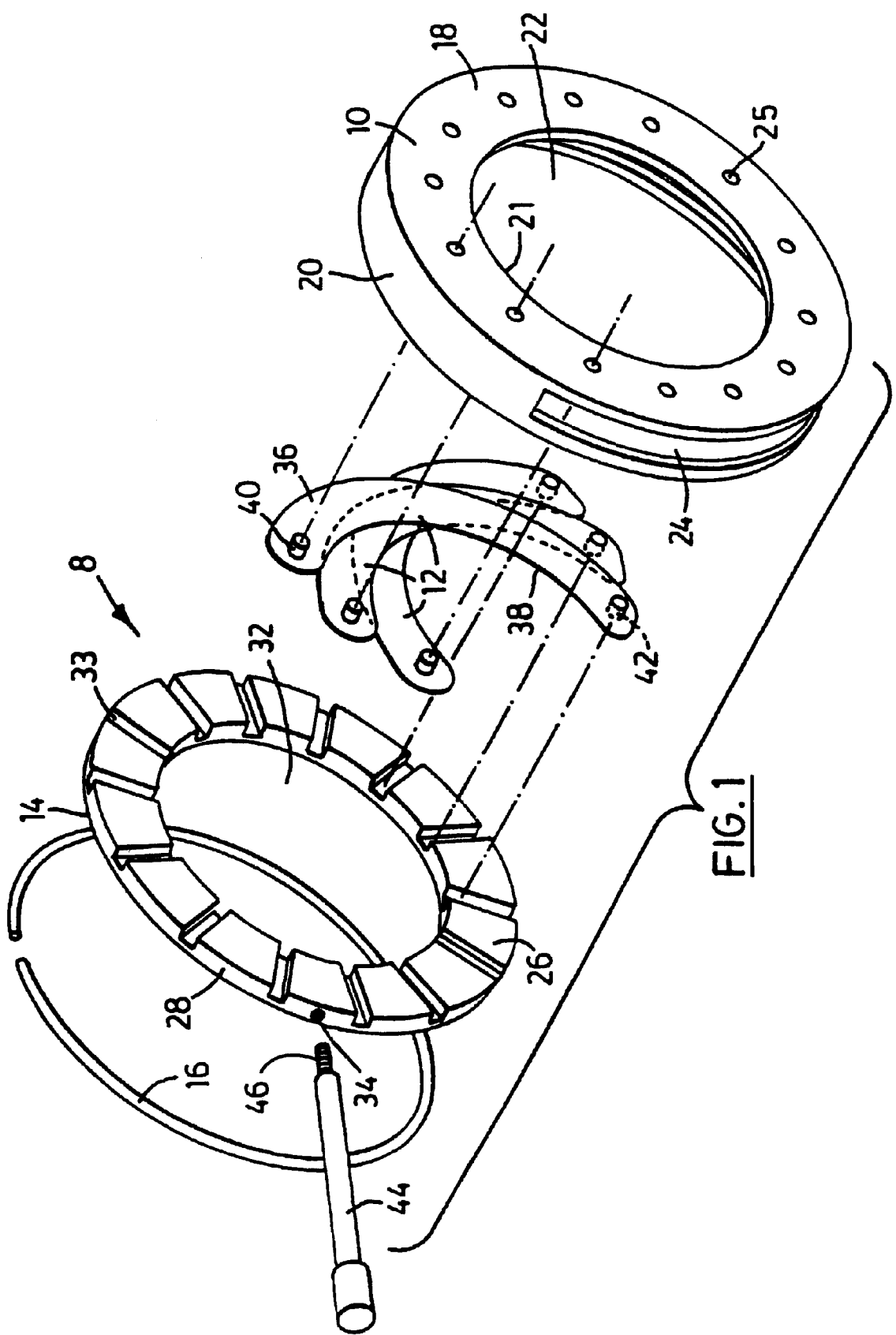
FIG. 1 is an exploded view of moveable means for defining an aperture.

In the description which follows, like parts are marked throughout the specification and the drawings with the same respective reference numerals. The drawings are not necessarily to scale and in some instances proportions may have been exaggerated in order to more clearly depict certain features of the invention.

FIG. 1 shows an exploded view of the moveable means for defining an aperture 8. Said moveable means contains a first ring 10, a plurality of elongated, curved members 12, a second ring 14, and a retainer 16. Said first ring 10 has a front wall 18, a side wall 20, a first ring orifice 21 and a first ring opening 22. Said side wall 20 contains a side opening 24 which is parallel with the circumference of said front wall 18. Said first ring front wall 18 contains a plurality of locating holes 25. Said second ring 14 comprises a front wall 26, a side wall 28 and a second ring opening 32. Said second ring front wall 26 contains a plurality of radially disposed locating grooves 33. Said side wall 28 contains a shaft hole 34, further described below.

Each of said elongated members 12 has a front side 36 and a back side 38. Each of said elongated members 12 has a front pin 40 at one extremity of said front side 36 and a back pin 42 at the opposite extremity of said back side 38. Each of said front pins 40 communicates with said locating holes 25, so as to permit said elongated members 12 to be rotatably connected to said first ring 10. When said elongated members 12 are rotatably connected to said first ring 10, said elongated members 12 overlap.

Said second ring 14 is slightly smaller than said first ring 10, accordingly, said second ring 14 can be fitted into said first ring orifice 21 and is held in place by retainer 16. Once said elongated members 12 are connected to said first ring 10, said second ring 14 is fitted into said first ring orifice 21 so that said back pins 42 communicate with said locating grooves 33. A shaft 44 having threadable end 46 can be screwed into said shaft hole 34 through side opening 24.

When shaft 44 is moved between the two extremities of said side opening 24, said second ring 14 is rotated within said first ring orifice 21. Said rotating motion of said second ring 14 within said first ring orifice 21 causes said front pins 40 to rotate in said locating holes 25 contemporaneously so that said elongated members 12 are radially displaced around said locating holes 25, while said back pins 42 slide within said locating grooves 33 so as to, in combination, open and close a variable aperture.

Figure 2:
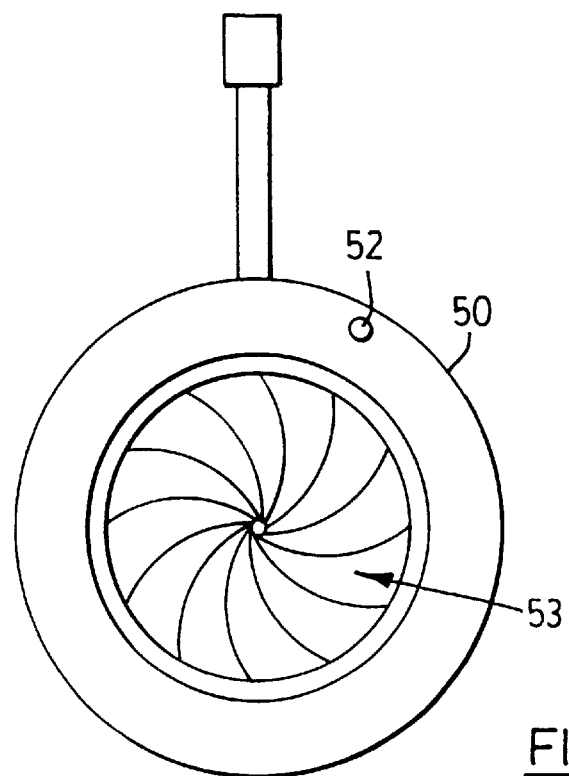
FIG. 2 is a perspective view of said moveable means in closed position.

FIG. 2 shows a perspective view of the moveable means for defining an aperture 8 shown in FIG. 1 which has been fitted into casing 50. Said casing 50 contains a casing locating notch 52 and casing annular recess 53. Said FIG. 2 shows the aperture in a closed position.

Figure 3:
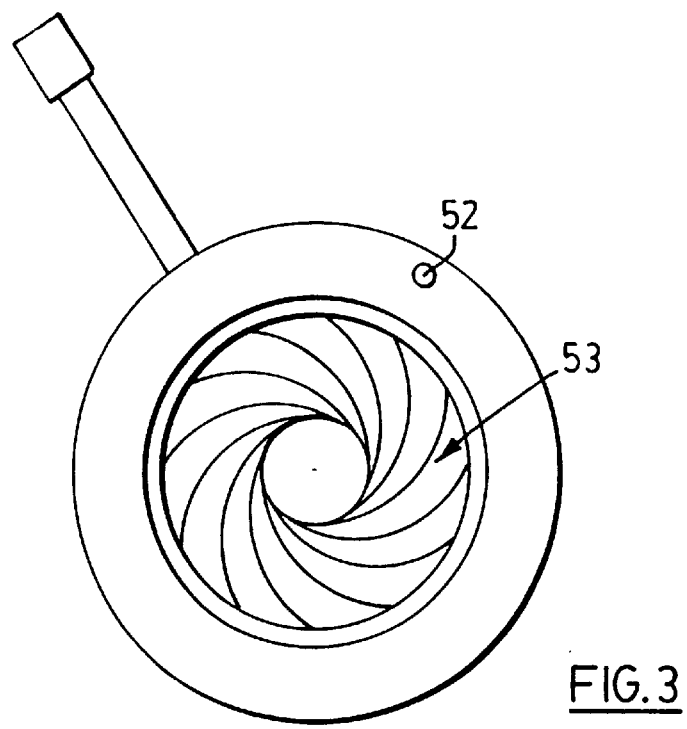
FIG. 3 is a perspective view of said moveable means in open position.

FIG. 3 shows a perspective view of the moveable means for defining an aperture shown in FIG. 2 in an open position.

Figure 4:
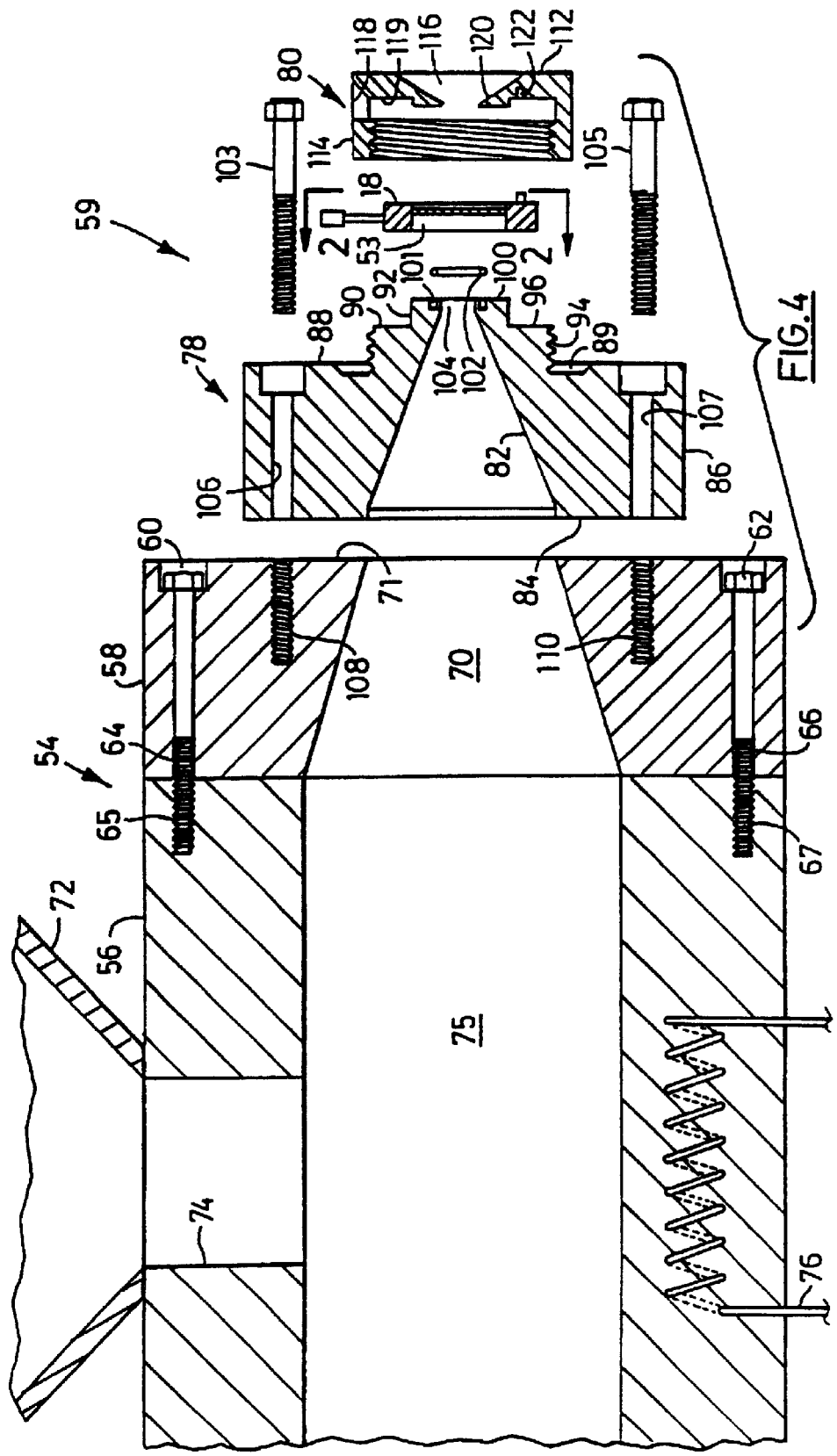
FIG. 4 is a cross-sectional view of the apparatus.

FIG. 4 shows a cross-sectional view of the extruder 54. Said extruder 54 contains extruding member 56, first die block 58 and extruder die 59. In the embodiment shown in FIG. 4, said first die block 58 is connected to said extruding member 56 by means of a plurality of screws such as screws 60 and 62 which engage a plurality of screw holes such as screw holes 64 and 66 disposed in said first die block 58 which screw holes 64 and 66 communicate with corresponding screw holes 65 and 67 disposed in extruding member 56.

First die block 58 has an extrusion orifice 70 and a die front wall 71.

The embodiment of the invention shown in FIG. 4 is adapted to discharging extrudable materials that are melt flowable. Plastic elements, for example, are poured into extruder hopper 72 which communicates with extruder hopper opening 74 disposed in said extruding member 56.

Said extruder hopper opening 74 communicates with extruder barrel 75. FIG. 4 shows schematically a heating element 76 to heat, for example, plastic pellets to an appropriate temperature in a manner well-known to those skilled in the art, so as to produce a thermoplastic material in an extrudable form.

Extruder die 59 also contains a first retaining member 78 and a second retaining member 80. First retaining member 78 contains a conical hole 82 which communicates with extrusion orifice 70. Said first retaining member 78 also contains a back wall 84, a side wall 86, front wall 88, annular recess 89, larger cylindrical protrusion 90, and smaller cylindrical protrusion 92.

Said larger cylindrical protrusion 90 extends from inside annular recess 89. Larger cylindrical protrusion 90 has a first protrusion side wall 94 which is threaded, and a first protrusion front wall 96. Smaller cylindrical protrusion 92 extends from said first protrusion front wall 96 and has a second protrusion front wall 100. Said second protrusion front wall 100 has an annular groove 101 for accommodating sealing means 102 and a bore 104.

Said first retaining member 78 is connected to said first die block 58 by means of a plurality of screws such as screws 103 and 105 which engage a plurality of screw holes such as screw holes 106 and 107 located on said first retaining member front wall 88 which correspond with a plurality of screw holes such as screw holes 108 and 110 located on said die front wall 71.

Said second retaining member 80 contains a front face 112 and a lateral wall 114. Said front face 112 has a conical recess 116. Lateral wall 114 has a longitudinal opening 118 for accommodating said shaft 44 of said moveable means defining an aperture 8. The inside of front face 112 has a round protrusion 120 and a locating cavity 122. Said casing annular recess 53 registers with round protrusion 92, and said casing locating pin 52 registers with said locating cavity 122 so as to allow said moveable means for defining an aperture 8 to be mounted on the inside of said front face 112.

The inside of lateral wall 114 is threaded so as to allow said second retaining member 80 to be threadably connected to said first retaining member 78, thus mechanically engaging said moveable means for defining an aperture 8 and said sealing means 102 between said first retaining member 78 and second retaining member 80, so as to prevent seepage of said melted thermoplastic material when said thermoplastic material is extruded through, or shaped by, the variable aperture.

Figure 5:
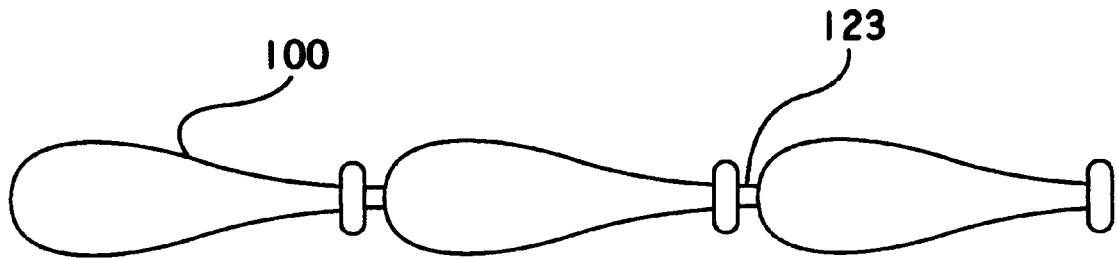
FIG. 5 is a view of bats made by the process and apparatus.
Figure 5A:
FIG. 5a is an alternate embodiment of the bats made by the process and apparatus.

In operation, thermoplastic material is introduced into hopper 72 and heated by heating means 76 and shaped or extruded. The thermoplastic material is extruded through the variable apparatus to shape or extrude a rod of material having a variable diameter as shown in FIG. 5. The method and apparatus described herein can be used to produce a number of products including foam bats 100 which may be connected together by a web 123 or designed adjacent one another as shown in FIG. 5a. If a web 123 is used or if the bats are adjacent one another the bats may be severed in a severing step. In operation the shaft 44 may be connected to a linkage to a motor (not shown) so as to cause the shaft 44 and thus the apparatus to open and close in a sequence to produce the desired products. The linkage may include camming lobes to open and close the apparatus in an asymmetric manner to produce for example the bat. Other examples of products that can be made include water toys such as foam water logs, swing set coverings—foam tubing for covering swing sets and one could produce variable outside diameters for decorative purposes, custom packaging profiles to cradle parts during shipping, foam baseball bats and bowling pins for children, toilet tank floats, neck support cushions, fishing floats and pool and beach safety line floats.

The embodiment of the invention depicted in FIG. 4 and described in detail above is particularly adapted for extruding rod-like products. The disclosed invention, however, is also adaptable to extruding a variety of tubular members having a variable outer diameter by placing, for example, a mandrel in the extruder 54 upstream from said moveable means defining an aperture 8, in a manner well-known to those skilled in the art.

Various embodiments of the invention have now been described in detail. Since changes in and/or additions to the above-described best mode may be made without departing from the nature, spirit or scope of the invention, the invention is not to be limited to said details.

I claim:

1. Apparatus for extruding an elongated article having a cross-sectional profile dependant on the cross-section of a varying aperture, comprising:

(a) an extruder for heating a thermoplastic material to form an extrudable thermoplastic foam to define said elongated article, said extruder having an orifice formed therein;

(b) a shaping means communicating with said orifice, said shaping means defining the varying aperture to impart a variable cross-section to said thermoplastic foam when discharged from said extruder;

(c) a first retaining member having a first hole therethrough;

(d) a second retaining member having a second hole therethrough, said first retaining member engageable with said second retaining member so as to retain said shaping means between said members with said holes communicating with said orifice;

(e) an o-ring mounted between the first retaining member and said shaping means; and (f) said first and second retaining member presenting means for threadably engaging said first retaining member and second retaining member so that said retaining members, o-ring and shaping means are engaged; and wherein said shaping means includes a plurality of curved members movable between a first closed position closing said aperture to inhibit flow of said thermoplastic foam through said orifice and a second open position to permit flow of said thermoplastic foam through said orifice.

2. Apparatus as recited in claim 1, wherein said shaping means further includes an activating shaft to activate the movement of said curved members.

3. Apparatus as claimed in claim 1, wherein said first retaining member presents an annular groove for receiving said o-ring.

4. Apparatus as recited in claim 1, wherein said o-ring comprises rubber or other elastomeric or resilient material.

5. Apparatus for extruding an elongated article having a cross-sectional profile imparted by a variable shaping aperture, comprising:

(a) an extruder for heating a thermoplastic material to form an extrudable thermoplastic foam to define said elongated article, said extruder having an orifice formed therein;

(b) a shaping means for defining the variable shaping aperture communicating with said orifice so as to continuously shape said thermoplastic foam;

(c) a first retaining member having a first hole therethrough and an annular groove;

(d) a second retaining member having a second hole therethrough, said first retaining member engageable with said second retaining member so as to retain said shaping means between said retaining members with said holes and variable shaping aperture communicating with said orifice; and (e) an o-ring disposed within said annular groove bearing against said shaping means to inhibit discharge of said thermoplastic foam other than through said variable shaping aperture, when said o-ring and said shaping means are retained between said retaining members; and wherein said shaping means includes a plurality of curved members movable between a first closed position closing said aperture to inhibit flow of said thermoplastic foam through said orifice and a second open position to permit flow of said thermoplastic foam through said orifice.

6. Apparatus as recited in claim 5, wherein said shaping means further includes an activating shaft to activate the movement of said curved members.

7. Apparatus for extruding an elongated article having a cross-sectional profile imparted by a variable shaping aperture, comprising:

(a) an extruder for heating a thermoplastic material to form an extrudable thermoplastic foam to define said elongated article, said extruder having an orifice formed therein;

(b) shaping means comprising a plurality of curved members, said shaping means communicating with said orifice and defining the variable shaping aperture;

(c) retaining member having a hole therethrough communicating with said orifice; and (d) o-ring;

wherein said retaining member is engageable with said extruder so as to retain said shaping means between said extruder and retaining member; said retaining member is further engageable with said extruder so as to mount said o-ring between said extruder and shaping means; and said shaping means is moveable between a first closed position and a second open position;

wherein said first closed position closes said variable shaping aperture to inhibit flow of said thermoplastic foam through said orifice, and said second open position permits flow of said thermoplastic foam through said orifice.

8. An apparatus as claimed in claim 7, wherein said retaining member is removably attached to said extruder.

9. An apparatus as claimed in claim 7, wherein said o-ring comprises rubber or other elastomeric or resilient material.

10. Apparatus for extruding an elongated article having a cross-sectional profile imparted by a variable shaping aperture, comprising:

(a) an extruder for heating a thermoplastic material to form an extrudable thermoplastic foam to define said elongated article, said extruder having an orifice formed therein and presenting an annular groove;

(b) a shaping means comprising a plurality of curved members, said shaping means being engageable with said extruder so as to communicate with said orifice and define said variable shaping aperture; and (c) an o-ring mounted within said annular groove which bears against said shaping means;

wherein said shaping means is moveable between a first closed position and a second open position;

wherein said first closed position closes said variable shaping aperture to inhibit flow of said thermoplastic foam through said orifice, and said second open position permits flow of said thermoplastic foam through said orifice.

11. An apparatus as claimed in claim 10, wherein said shaping means is removably attached to said extruder.

12. An apparatus as claimed in claim 10, wherein said o-ring comprises rubber or other elastomeric or resilient material.

* * * * *